United States Patent [19]

Kotovitch

[11] 3,994,561

[45] Nov. 30, 1976

[54] MOULDING HAVING A DECORATIVE AND/OR PROTECTIVE FACE

[75] Inventor: Boris Kotovitch, Rhode St. Genese, Belgium

[73] Assignee: Commerciale d'Applications Industrielles S.p.r.l., Brussels, Belgium

[22] Filed: May 8, 1975

[21] Appl. No.: 575,513

Related U.S. Application Data

[63] Continuation-in-part of Ser. No. 431,780, Jan. 8, 1974, abandoned.

[30] Foreign Application Priority Data

Jan. 16, 1973 Belgium .............................. 126518

[52] U.S. Cl. .............................. 350/103; 116/28 A; 350/97
[51] Int. Cl.² ........................................ G02B 5/124
[58] Field of Search .............. 350/67, 104, 103, 97, 350/107, 100, 101, 109, 105, 106, 299; 293/60, 71 R; 116/28 A, 28 R

[56] References Cited

UNITED STATES PATENTS 1,514,653  11/1924  Cardwell ............................. 350/101
3,687,794  3/1971  Shanok et al. ........................ 116/28

Primary Examiner—John K. Corbin
Assistant Examiner—B. Wm. de los Reyes
Attorney, Agent, or Firm—Stevens, Davis, Miller & Mosher

[57] ABSTRACT

A reflective moulding including a transparent or translucent outer covering portion having a first convex face through which light may enter and be reflected and a second face on the side opposite the first face. The moulding further includes two flexible elements, one of which is adapted to shine in daylight and the other of which is adapted to shine in artificial light. A first one of the elements is perforated and is positioned between the second face and the other second one of the elements so that the second element may receive and reflect light transmitted through the covering portion and the perforations in the first element.

16 Claims, 8 Drawing Figures

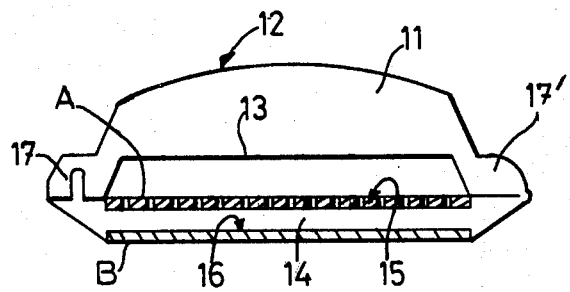
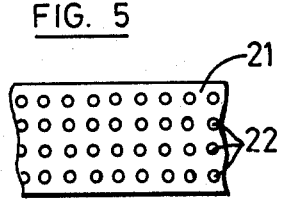
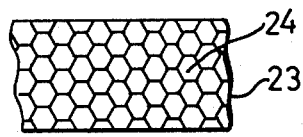
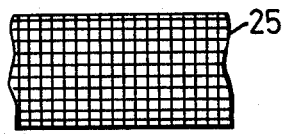
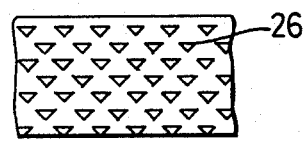

MOULDING HAVING A DECORATIVE AND/OR PROTECTIVE FACE

This application is a continuation-in-part of applicant's co-pending U.S. patent application Ser. No. 431,780 now abandoned, filed Jan. 8, 1974.

The present invention relates to an improvement made to a moulding described in applicant's co-pending U.S. patent application Ser. No. 431,780 now abandoned, which has a decorative and/or protective face of a synthetic material and is intended to be applied to a support, such as in particular the body of a vehicle.

According to U.S. patent application Ser. No. 431,780 now abandoned, the moulding is transparent or translucent and on the side opposite the decorative face has facets forming cats-eyes capable of reflecting light in its focal plane through the decorative face. With the aid of this moulding, a vehicle having this moulding thereon is made visible at night from a great distance, even if it is not illuminated by its own means, when the moulding receives the light of an incident source, particularly the light of the headlamps of another vehicle, so that collisions may be avoided. In addition, during the daytime the rays of the sun striking the facets of the cats-eyes can create highly appreciated decorative effects.

In the variant (not illustrated) of U.S. patent application Ser. No. 431,780 now abandoned, facets forming cats-eyes were provided in a colored or uncolored flexible sheet applied against the face opposite the decorative face of the moulding and reflecting the light through that face. In this variant the sheet provided with the facets is fixed against the face opposite the decorative face of the moulding, for example by welding or adhesive bonding, and consequently the profile of the facets is impressed in the said opposite face.

Furthermore, in another variant of U.S. patent application No. 431,780, which is illustrated in FIG. 6 thereof, there is provided, on the face opposite the decorative face of the moulding, a flexible film capable of increasing the reflecting effect of the facets, for example a sheet of bright metallized polyester fixed to the opposite face by welding or adhesive bonding.

When the invention was put into practice, it was, however, observed that mouldings according to these variants did not give entirely satisfactory performance at night, although they provided an agreeable decorative effect in daylight.

It has now not unsurprisingly been found that a decorative moulding for vehicles can be made visible at night by providing, on the face opposite the decorative face, a metallized flexible sheet forming facets and previously covered with a perforated fabric adapted to shine in artificial light. Since the sheet is visible through the apertures in the fabric, it sparkles in daylight, while at night time the fabric in turn glistens.

It has in addition been found that the order of the two elements may be reversed, that is to say an element adapted to shine at night may be covered by a perforated element suitable for daylight; the first-mentioned element may be sealed in the focal plane of the moulding together with the other element or may be fixed to the base of the moulding.

It has been found that mouldings of this kind according to the present improvement conform to requirements in respect of road safety.

The improvement to the transparent or translucent moulding of U.S. patent application Ser. No. 431,780, in which facets forming cats-eyes are provided in a colored or uncolored flexible sheet joined by welding or adhesive bonding against the face opposite the decorative and/or protective face, and reflecting light through that face, consists in providing in the focal plane of the moulding, instead of a single sheet, two superimposed flexible elements of which one is adapted to shine in daylight and the other in artificial light, the element applied against the face opposite the decorative face having perforations which enable the element covered by it to receive light.

As an alternative, the unperforated element may be applied against the outer face of the base of the moulding.

According to this improvement, the element adapted to shine in daylight is a flexible metallized sheet of synthetic material, which sheet is uniformly plane or has perforations or folds, such as trihedrons disposed regularly and adapted to produce multiple reflections, and the element adapted to shine in artificial light is a flexible sheet or fabric covered or impregnated with a substance adapted to transmit or reflect light when subjected to the incident radiation of a distant light source, this substance being distributed uniformly over the surface of the sheet or in such a manner as to form a pattern capable of producing multiple reflections.

The accompanying drawing illustrates as examples two embodiments of the invention.

FIG. 4 shows a moulding according to FIG. 1, in which a single element has been sealed, the other being fixed to the base, and FIGS. 5 to 8 show in plan a detail of four reflector elements according to the invention.

In these Figures, the same reference numbers designate identical parts.

Figure 1:
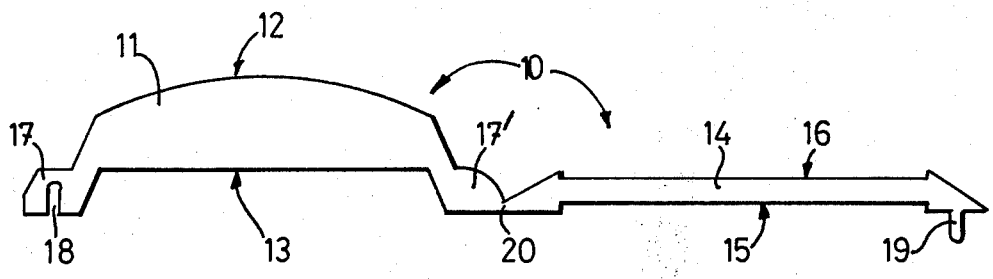
FIGS. 1 and 2 are cross-sections of two mouldings according to U.S. patent application Ser. No. 431,780 now abandoned, as they leave an extruder.

A moulding 10 (FIG. 1), which is made of flexible transparent or translucent thermoplastic material, comprises on the one hand a top portion 11 bounded by a transversely convex face 12, for decoration and/or protection, and a face 13 on the side opposite the first-mentioned face 12, and on the other hand a bottom portion or base 14 bounded by an inner face 15 and an outer face 16.

The upper part 11 consists of a magnifying lens whose plane portion 13 rests on two supports 17 and 17'. The support 17 may have a notch 18 shaped to receive a button 19 provided at the end of the base 14. The other end of the base is connected to the support 17' by a part 20 of small section which forms a hinge for folding over the base 14 against the supports 17 and 17', so that the moulding can then be closed by pressing the button into the notch.

Figure 2:
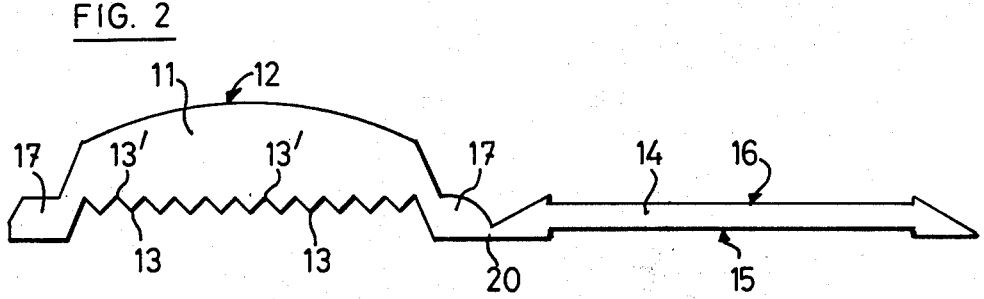
Figure 3:
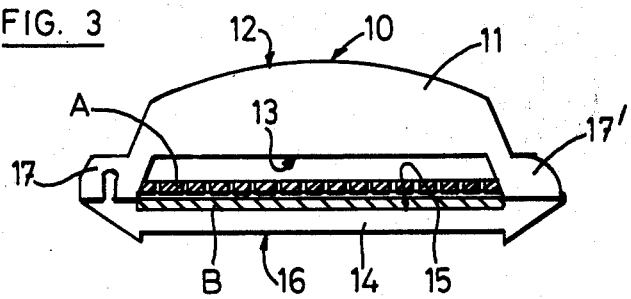
FIG. 3 is a cross-section of a moulding according to FIG. 1, in which two elements adapted to shine in light are sealed.

FIG. 2 shows a moulding, which differs from that described previously in that closing must be effected by heat sealing because the support 17 and the opposite end of the base 14 are not provided respectively with a notch and a button for the purpose of closing the moulding in the cold state.

Furthermore, the face 13 on the side opposite the decorative face 12 may be shaped in the form of trihedrons whose apices 13' are directed towards the decorative face 12, as shown in FIG. 6 of U.S. patent application Ser. No. 431,780 now abandoned.

In the variant (not illustrated) of U.S. patent application Ser. No. 431,780 now abandoned, the free space between the face 13 (or the base of the trihedrons 13') and the face 15, containing the focal plane of the magnifying glass, may contain a flexible reflecting sheet which is adhesively bonded or welded, before the closing, to the inner face 15 of the base 14, so that, after the closing of the moulding, the light coming from a distant light source will fall on the sheet, the reflected light travelling on the same optical path in the opposite direction; the moulding therefore behaves like a cats-eye.

According to an improvement, this free space receives two elements, one of which is adapted to shine in daylight and the other adapted to shine in artificial light, these two elements being adhesively bonded to the inner face 15 of the base 14. The element A, which will be nearer to the face 13 after the moulding has been closed, is perforated, while the element B adjoining the base 14 is not perforated. In this way the element B may be illuminated by means of the perforations of the element A.

In view of the fact that the natural or artificial incident light must necessarily pass through the magnifying glass to fall either on A or on B, that is to say substantially in the focal plane of the magnifying glass, and since the element A is perforated, the moulding constitutes in fact an assembly of cats-eyes.

As an alternative, the element B may be applied against the outer face 16 of the base (FIG. 4).

The perforated element A suitable for reflecting daylight may for example be a flexible metallized sheet 21 (FIG. 5) of synthetic material, having a multiplicity of perforations 22. The unperforated element B associated with this perforated sheet 21 and suitable for reflecting artificial light may be a flexible sheet covered or impregnated with a substance adapted to transmit or reflect artificial light when subjected to incident radiation coming from a distant light source. This substance may be distributed uniformly or else it may be distributed in such a manner as to form a transmitter and/or reflector element 23 (FIG. 6) which has a pattern 24, the repetition of this pattern being able to produce a multiplicity of reflections.

The order of the elements may also be reversed, that is to say the perforated element A may be an element adapted to shine in artificial light, such as a fabric 25 (FIG. 7) sprinkled or impregnated with the aforesaid substance, forming a regular trellis. In this embodiment of the invention, the element B applied against the inner face 15 or outer face 16 and associated with the trellis 25 may be a flexible metallic sheet which is smooth or provided with holes such as trihedrons 26 (FIG. 8) disposed regularly in order to increase the reflecting effect of the sheet.

The invention is obviously not limited to the two embodiments which have been described and illustrated by way of example, and modifications could be made thereto without departing from its scope.

What I claim is:

1. A reflective moulding comprising:
    a translucent outer covering portion having a first face through which light may enter and be reflected and a second face on the side opposite the first face,
    two superimposed flexible elements adjacent the second face, one of said elements being adapted to shine in daylight and the other one of said elements being adapted to shine in artificial light, and
    a first one of said elements having perforations defined therein and being positioned between the second face and the other second one of said elements so that the second element may receive and reflect light transmitted through the covering portion and the perforations in the first element.

2. A reflective moulding as claimed in claim 1, further comprising:
    a base, and
    said second element is secured to the face of said base most distant from the outer covering portion.

3. A reflective moulding as claimed in claim 2, wherein:
    the element adapted to shine in daylight comprises a flexible metallized synthetic sheet, and
    the element adapted to shine in artificial light comprises a flexible member.

4. A reflective moulding as claimed in claim 3, wherein:
    the perforations are defined in said flexible metallized synthetic sheet.

5. A reflective moulding as claimed in claim 4 wherein:
    each of the perforations comprises a trihedron.

6. A reflective moulding as claimed in claim 3 wherein:
    said member comprises a flexible sheet covered with a substance adapted to transmit light when subjected to the incident radiation from a distant light source.

7. A reflective moulding as claimed in claim 3, wherein:
    said member comprises a fabric impregnated with a substance adapted to transmit light when subjected to the incident radiation from a distant light source.

8. A reflective moulding as claimed in claim 3, wherein:
    said member comprises a flexible sheet covered with a substance adapted to reflect light when subjected to the incident radiation from a distant light source.

9. A reflective moulding as claimed in claim 3, wherein:
    said member comprises a fabric impregnated with a substance adapted to reflect light when subjected to the incident radiation from a distant light source.

10. A reflective moulding as claimed in claim 1, wherein:
    said first face is convex.

11. A reflective moulding as claimed in claim 1, wherein:
    said first element comprises a flexible metallized sheet of synthetic material, and
    said second element comprises a flexible sheet covered with a substance adapted to transmit light when subjected to the incident radiation from a distant light source.

12. A reflective moulding as claimed in claim 1, wherein:
    said first element comprises a fabric impregnated with a substance adapted to transmit light when subjected to the incident radiation from a distant light source, and
    said second element comprises a flexible metallic sheet.

13. A reflective moulding as claimed in claim 12, wherein:
   said sheet has holes defined therein.

14. A reflective moulding as claimed in claim 1, wherein:
   said first element comprises a flexible metallized sheet of synthetic material, and
   said second element comprises a flexible sheet covered with a substance adapted to reflect light when subjected to the incident radiation from a distant light source.

15. A reflective moulding as claimed in claim 1, wherein:
   said first element comprises a fabric impregnated with a substance adapted to reflect light when subjected to the incident radiation from a distant light source, and
   said second element comprises a flexible metallic sheet.

16. A reflective moulding as claimed in claim 15, wherein:
   said sheet has holes defined therein.

\* \* \* \* \*